United States Patent
Luo et al.

(10) Patent No.: US 7,838,600 B2
(45) Date of Patent: Nov. 23, 2010

(54) PROCESS FOR THE PREPARATION OF AMPHIPHILIC POLY(N-VINYL-2-PYRROLIDONE) BLOCK COPOLYMERS

(75) Inventors: Laibin Luo, Pierrefonds (CA); David Lessard, Montreal (CA); Sandra Gori, Montreal (CA); Maxime Ranger, Montreal (CA); Yuan Wang, Brossard (CA); Julie Lafreniere, Saint-Bruno (CA); Jean-Francois Meunier, Montreal (CA); Genevieve Bibeau, Montreal (CA); Frederic Lebrun, Saint-Constant (CA); Lu Wei Liu, Brossard (CA)

(73) Assignees: Labopharm, Inc., Laval (CA); Labopharm Europe Limited, Dublin (IE); Labopharm (Barbados) Limited, Christchurch (BB)

( * ) Notice: Subject to any disclaimer, the term of this patent is extended or adjusted under 35 U.S.C. 154(b) by 0 days.

(21) Appl. No.: 12/211,551

(22) Filed: Sep. 16, 2008

(65) Prior Publication Data

US 2009/0012240 A1  Jan. 8, 2009

Related U.S. Application Data

(63) Continuation of application No. 11/834,422, filed on Aug. 6, 2007, which is a continuation of application No. 10/727,083, filed on Dec. 2, 2003, now Pat. No. 7,262,253.

(51) Int. Cl.
*C08F 126/10* (2006.01)
*C08F 226/10* (2006.01)

(52) U.S. Cl. .................. 525/326.7; 525/326.9; 525/350; 525/92 B

(58) Field of Classification Search .............. 525/326.7, 525/326.9, 350, 92 B
See application file for complete search history.

(56) References Cited

U.S. PATENT DOCUMENTS

| | | | | |
|---|---|---|---|---|
| 5,112,899 | A * | 5/1992 | Yamaya et al. | 524/413 |
| 6,506,836 | B1 * | 1/2003 | Bremser et al. | 525/64 |
| 6,756,449 | B2 * | 6/2004 | Benz et al. | 525/326.9 |
| 7,018,655 | B2 * | 3/2006 | Lele et al. | 424/486 |
| 2003/0157170 | A1 * | 8/2003 | Liggins et al. | 424/468 |

\* cited by examiner

*Primary Examiner*—Nathan M Nutter
(74) *Attorney, Agent, or Firm*—Paul Marcoux

(57) ABSTRACT

The instant invention provides a two-step polymerization process for preparing amphiphilic poly(N-vinyl-2-pyrrolidone), (PVP)-block-polyester copolymers and other diblock and triblock copolymers consisting of PVP as one block. The block copolymers of the invention can be used as vehicles for drug delivery.

23 Claims, 10 Drawing Sheets

FIGURE 5A
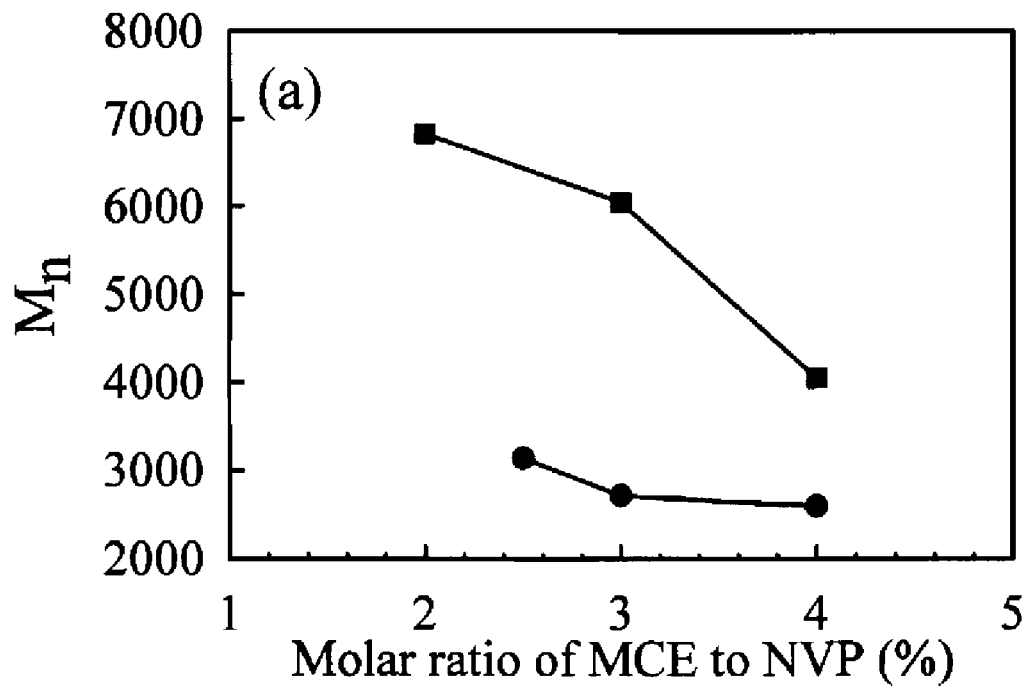
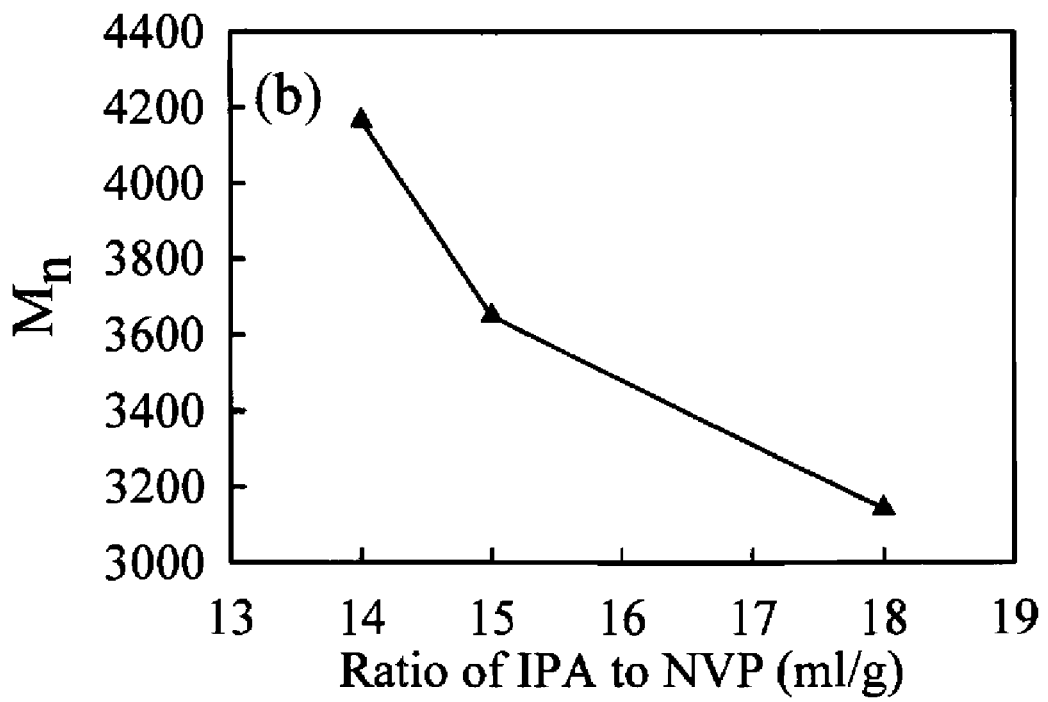
FIGURE 5B

PROCESS FOR THE PREPARATION OF AMPHIPHILIC POLY(N-VINYL-2-PYRROLIDONE) BLOCK COPOLYMERS

CROSS REFERENCE TO RELATED APPLICATIONS

This application is a continuation of U.S. patent application Ser. No. 11/834,422, filed Aug. 6, 2007, which is a continuation of U.S. patent application Ser. No. 10/727,083, filed Dec. 2, 2003, now U.S. Pat. No. 7,262,253, issued Aug. 28, 2007, the contents of which are herein incorporated by reference.

FIELD OF THE INVENTION

The invention relates generally to processes for preparation of block copolymers; particularly to processes for preparation of block copolymers by a two-step polymerization and most particularly to processes for preparing diblock and triblock copolymers comprising the steps of: (a) performing radical polymerization of N-vinyl-2-pyrrolidone in the presence of a radical initiator, a chain transfer agent (optionally) and an alcoholic solvent to form hydroxy-terminated poly(N-vinyl-2-pyrrolidone) and (b) performing ionic polymerization of monomers or comonomers in the presence of a catalyst or base and a macroinitiator wherein said macroinitiator is the hydroxy-terminated poly(N-vinyl-2-pyrrolidone) formed in step (a) thereby preparing said diblock and triblock copolymers. Poly(N-vinylpyrrolidone) formed in step (a) has a molecular weight between 1,000 D and 700 kD and the diblock and triblock copolymers have a molecular weight between 2,000 D and 700 kD.

BACKGROUND OF THE INVENTION

The synthesis of well-defined polymers with controlled chain end functionalities is important for the achievement of nanotechnology. These polymers have been especially important as potential drug delivery vehicles. In the last decade, the use of various controlled polymerizations have resulted in well-defined copolymers with different designs. For example, nitroxide-mediated polymerization, dithio component-mediated reversible addition-fragmentation chain transfer and atom transfer radical polymerization (ATRP) are controlled processes, which offer control over molecular weight and molecular architecture (diblock, grafted or tapered copolymers). However, a few monomers such as vinyl acetate and N-vinyl-2-pyrrolidone (VP) do not form radicals stabilized by resonance and inductive effects, and therefore the polymerization of these monomers has not yet been performed efficiently by controlled radical polymerizations. Matyjaszewski et al. (Am. Chem. Soc. Symp. Ser. 685:258 1998 and J. Polym. Sci. Part A:Polym. Chem. 36:823-830 1998) reported the homopolymerization of VP using Me$_4$Cyclam as a ligand. Chain end functionalities were difficult to obtain using the synthetic pathway described by Matyjaszewski et al.

The instant inventors are interested in functionalized and well-defined poly(N-vinyl-2-pyrrolidone) (PVP) as a replacement for poly(ethylene glycol) (PEG) in diverse drug delivery systems. Although a number of diblock or triblock copolymers can form micelles in aqueous solution, few among them are truly suitable as drug carriers due to biocompatibility issues [Alexandridis et al. Current Opinion Colloid & Interface Science 2:478-489 1997; Rapoport et al. J. Pharm. Sci. 91:157-170 2002; Kabanov et al. Adv. Drug Deliv. Rev. 54:223-233 2002; Nishiyama et al. Langmuir 15:377-383 1999; Kakizawa et al. Langmuir 18:4539-4543 2002; Katayose et al. Bioconjugate Chem. 8:702-707 1997; Yamamoto et al. J. Controlled Release 82:359-371 2002; Liggins et al. Adv. Drug Deliv. Rev. 54:191-202 2002; Kim et al. J. Controlled Release 72:191-202 2001; Yoo et al. J. Controlled Release 70:63-70 2001; Luo et al. Bioconjugate Chem. 13:1259-1265 2002; Lim Soo et al. Langmuir 18:9996-10004 2002; Gref et al. Science 263:1600-1603 1994 and Burt et al. Colloids Surf. B 16:161-171 1999]. Many studies have reported the use of polyester-block-poly(ethylene glycol) block copolymers [Yamamoto et al.; Liggins et al.; Kim et al.; Yoo et al.; Luo et al.; Lim Soo et al.; Gref et al. and Burt et al. journal citations, supra]. PEG is widely used as hydrophilic arm on the surface of nanoparticles [Kissel et al. Adv. Drug Deliv. Rev. 54:99-134 2002], liposomes [Gabizon et al. Adv. Drug Deliv. Rev. 24:337-344 1997] and polymeric micelles [Jones et al. Eur. J. Pharm. Biopharm. 48:101-111 1999; Kataoka et al. Adv. Drug Deliv. Rev. 47:113-131 2001 and Kabanov et al. Adv. Drug Deliv. Rev. 54:759-779 2002]. The PEG-based outer shell can actually prevent the nanocarrier uptake by the mononuclear phagocytic system via steric effects [Jones et al.; Kataoka et al. and Kabanov et al. journal citations; supra]. This prevention substantially improves the circulation time of polymeric micelles in the blood stream. In cancer treatment, this prolonged time generally results in a selective accumulation in a solid tumor due to the enhanced permeability and retention effect of the vascular endothelia at the tumor site [Yokoyama et al. Cancer Res. 50:1693-1700 1990; Yokoyama et al. Cancer Res. 51:3229-3236 1991; Kwon et al. J. Controlled Release 29:17-23 1994; Yokoyama et al. J. Controlled Release 50:79-92 1998 and Yamamoto et al. J. Controlled Release 77:27-38 2001]. However, since aggregation of nanoparticles with PEG as corona occurs during lyophilization, it features some limitations. Thus, PEG is not ideally suited for efficient use in drug delivery systems.

Functionalized and well-defined PVP is an ideal component for replacement of PEG in drug delivery systems. PVP has been proven to be biocompatible [Haaf et al. Polymer J. 17:143-152 1985] and has been extensively used in pharmaceutical industry. Particularly, PVP can be used as cryoprotectant [Doebbler et al. Cryobiology 3:2-11 1966] and lyoprotectant [Deluca et al. J. Parent. Sci. Technol. 42:190-199 1988]. Hence, replacing PEG with PVP in drug delivery systems might help to overcome some freeze drying problems.

Torchilin et al. [J. Microencapsulation 15:1-19 1998] pioneered the study of PVP as hydrophilic corona of liposomes. The design of polymeric micelles with PVP outer shell have presented promising features for pharmaceutical uses. Thus, Benahmed et al. [Pharm. Res. 18:323-328 2001] reported the preparation of PVP-based micelles consisting of degradable diblock copolymers. In the work of Benahmed et al., PVP synthesis using 2-isopropoxyethanol as chain transfer agent was inspired from by previous work of Ranucci et al. [Macromol. Chem. Phys. 196:763-774 1995 and Macromol. Chem. Phys. 201:1219-1225 2000]. However, this synthetic procedure produced a lack of control over molecular weight, and did not quantitatively provide hydroxyl-terminated PVP, which is essential for polymerizing DL-lactide [Benahmed et al. Pharm Res. 18:323-328 2001]. Moreover, the removal of 2-isopropoxyethanol from the polymer turned out to be difficult because of its high boiling point (42-44° C. at 13 mmHg) and its binding to PVP via hydrogen bonding [Haaf et al. Polymer J. 17:143-152 1985]. Alcohol entrapment into polymer might cause problems for subsequent reactions which require anhydrous and aprotic conditions such as the synthesis of poly(D,L-lactide). Sanner et al. [Proceeding of the International Symposium on Povidone, University of Kentucky: Lexington, Ky., 1983, pp. 20] reported the synthesis of hydroxyl-terminated PVP oligomers via free radical polymerization in isopropyl alcohol (IPA), using cumene hydroperoxide as an initiator. $^1$H-NMR spectra have shown that there were 1.3 end groups of 2-hydroxyisopropyl per chain. It is suggested that significant termination by bimolecular combination occurred, between either a primary solvent radical and the propagating chains [Liu et al. Macromolecules 35:1200-1207 2002].

U.S. Pat. No. 6,338,859 (Leroux et al.) discloses a class of poly(N-vinyl-2-pyrrolidone)-block-polyester copolymers. Such PVP block copolymers represent new biocompatible and degradable polymeric micellar systems which do not contain PEG, but which exhibit suitable properties as drug carriers. PVP shows remarkable diversity of interactions towards non-ionic and ionic cosolutes. Prior to the disclosure by Leroux et al., only a random graft copolymer, poly(N-vinyl-2-pyrrolidone)-graft-poly(L-lactide) had been described in the literature [Eguiburu et al. Polymer 37:3615-3622 1996].

In the synthesis of the amphiphilic diblock copolymer disclosed by Leroux et al. hydroxy-terminated PVP was prepared by radical polymerization using 2-isopropoxyethanol as a chain transfer agent. The block copolymer was obtained by anionic ring opening polymerization. Although the strategy of Leroux et al. works very well for the preparation of the desired amphiphilic diblock copolymers in the laboratory, several problems remain to be solved in order to achieve a scalable process. The use of crown ether and the need of dialysis and ultra-centrifugation for the copolymer purification are not desirable on an industrial scale. Furthermore, in the process disclosed by Leroux et al., the degree of functionalization of hydroxyl-terminated PVP was not assessed.

What is lacking in the art is a process for preparing hydroxyl-terminated PVP, and using such functionalized PVP to prepare amphiphilic PVP-block-polyester block copolymers as well as other diblock or triblock copolymers consisting of PVP as one block; wherein the molecular weight, polydispersity index and functionality of the PVP can be controlled and wherein the process can be carried out on an industrial scale.

SUMMARY OF THE INVENTION

The instant invention provides a two-step polymerization process for preparing hydroxyl-terminated PVP and amphiphilic PVP-block-polyester as well as other diblock or triblock block copolymers consisting of PVP as one block. The process enables control of the molecular weight, polydispersity and functionality of the PVP. The diblock and triblock copolymers of the instant invention can be synthesized on an industrial scale for utilization in drug carrier systems.

The process of the instant invention comprises a two-step polymerization. The first step comprises free radical polymerization of VP in the presence of a radical initiator and an alcoholic solvent resulting in the synthesis of a low molecular weight PVP with a terminal hydroxyl group (PVP-OH). This step can be carried out with or without a chain transfer agent. The newly synthesized PVP-OH is purified by re-precipitation. The molecular weight of the PVP-OH can be effectively tuned and controlled by adjusting the molar ratios of radical initiator, chain transfer agent and alcohol to VP. With the use of higher concentrations, recombination of polymer chains is favored so that PVP with a hydroxyl group at both ends of each polymer chain (HO-PVP-OH) can be selectively obtained. Illustrative, albeit non-limiting examples of radical initiators are 2,2'-azobis(2-methyl-N-(2-hydroxyethyl)-propionamide (AMPAHE), 2,2'-azobis(2-methyl-N-[2-(1-hydroxybutyl)]-propionamide and 1,1' azobis(cyclohexane-carbonitrile). AMPAHE is a particularly preferred radical initiator, the use of which is illustrated in the examples herein. Illustrative, albeit non-limiting examples of alcoholic solvents are methanol, ethanol, isopropyl alcohol, n-propanol, n-butanol, tert-butanol, 1-pentanol and 2-pentanol. Isopropyl alcohol (IPA) is a particularly preferred alcoholic solvent, the use of which is illustrated in the examples herein. Illustrative, albeit non-limiting examples of chain transfer agents are 2-mercaptoethanol, 3-mercapto-1-propanol, 3-mercapto-2-propanol, 4-mercapto-1-butanol, 3-mercapto-2-butanol and 6-mercapto-1-hexanol. A particularly preferred chain transfer agent is 2-mercaptoethanol (MCE), the use of which is illustrated in the examples herein.

The second step of the process comprises anionic polymerization of a monomer or co-monomers using the dry hydroxyl-terminated PVP, synthesized in the first step, as a macroinitiator resulting in the formation of amphiphilic PVP-block-polyester diblock or triblock copolymers or other diblock and triblock copolymers consisting of PVP as one block. The second step is carried out using a catalyst or base in an inert aprotic solvent without the use of crown ether or other complexation agents. The newly formed block copolymers are isolated by precipitation and purified by dissolution and re-precipitation. No dialysis is necessary for purification. Charcoal treatment can be used to remove any color from the newly formed block copolymers. The molecular weight of the block copolymer and the percentage content of polyester can be controlled by adjusting the ratio of the macroinitiator and the monomer(s). Illustrative, albeit non-limiting examples of catalysts are aluminium and tin alkoxides. Illustrative, albeit non-limiting examples of bases are potassium and sodium hydride. Illustrative, albeit non-limiting examples of inert aprotic solvents are tetrahydrofuran, toluene, diethyl ether and tert-buytl methyl ether. Tetrahydrofuran is a preferred inert aprotic solvent, the use of which is illustrated in the examples herein.

Accordingly, it is an objective of the instant invention to provide a two-step polymerization process for preparing PVP, amphiphilic PVP-block-polyester copolymers and other diblock or triblock copolymers consisting of PVP as one block.

It is a further objective of the instant invention to provide a two-step polymerization process for preparing diblock and triblock copolymers wherein said process enables control of the molecular weight, polydispersity and functionality of the components of each of the polymerizations.

It is yet another objective of the instant invention to provide a two-step polymerization process for preparing diblock and triblock copolymers wherein said process can be carried out on an industrial scale.

It is a still further objective of the invention to provide (PVP)-block-polyester copolymers for use as drug carriers.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DEFINITIONS

The following list defines terms, phrases and abbreviations used throughout the instant specification. Although the terms, phrases and abbreviations are listed in the singular tense the definitions are intended to encompass all grammatical forms.

As used herein, the abbreviation "PEG" refers to poly (ethylene glycol).

As used herein, the abbreviation "PM" refers to polymeric micelles.

As used herein, the abbreviation "VP" refers to N-vinyl-2-pyrrolidone.

As used herein, the abbreviation "PVP" refers to poly(N-vinyl-2-pyrrolidone).

As used herein, the abbreviation "PVP-OH" refers to PVP with a hydroxyl group at one terminus of each polymer chain.

As used herein, the abbreviation "HO-PVP-OH" refers to PVP with hydroxyl groups at both termini of each polymer chain.

As used herein, the abbreviation "PDLLA" refers to poly (D,L-lactide).

As used herein, the abbreviation "PVP-b-PDLLA" refers to poly(N-vinylpyrrolidone)-block-poly(D,L-lactide).

As used herein, the abbreviation "MALDI-TOF" refers to matrix-assisted laser/desorption/ionization time-of-flight mass spectrometry.

As used herein, the abbreviation "MW" refers to molecular weight.

As used herein, the abbreviation "$M_w$," refers to weight average molecular weight.

As used herein, the abbreviation "$M_n$," refers to number-average molecular weight.

As used herein, the abbreviation "NMR" refers to nuclear magnetic resonance.

As used herein, the abbreviation "EA" refers to elementary analysis.

As used herein, the abbreviation "SEC-LS" refers to size-exclusion chromatography coupled to light-scattering detection.

As used herein, the abbreviation "IPA" refers to isopropanol or isopropyl alcohol.

As used herein, the abbreviation "AMPAHE" refers to 2,2'-azobis(2-methyl-N-(2-hydroxyethyl)-propionamide.

As used herein, the abbreviation "MCE" refers to 2-mercaptoethanol.

As used herein, the abbreviation "TBME" refers to tert-butyl methyl ether.

As used herein, the abbreviation "MIBK" refers to 4-methyl-2-pentanone.

As used herein, the abbreviation "THF" refers to tetrahydrofuran.

As used herein, the abbreviation "NaH" refers to sodium hydride.

As used herein, the abbreviation "LA" refers to D,L-lactide.

As used herein, the abbreviation "ATRP" refers to atom transfer radical polymerization.

As used herein, the abbreviation "DMF" refers to N,N-dimethylformamide.

As used herein, the abbreviation "TBA" refers to tert-butyl alcohol.

As used herein, the abbreviation "CAC" refers to critical association concentration.

As used herein, the abbreviation "DLS" refers to dynamic light scattering.

As used herein, the abbreviation "TGA" refers to thermogravimetry analysis.

As used herein, the abbreviation "CTA" refers to chain transfer agents.

As used herein, the abbreviation "PI" refers to polydispersity index.

BRIEF DESCRIPTION OF THE FIGURES

FIGS. 5A-B show data evidencing the influence of the ratios of MCE (FIG. 5A) and IPA (FIG. 5B) to VP on the $M_n$ of PVP-OH.

DETAILED DESCRIPTION OF THE INVENTION

Figure 1:
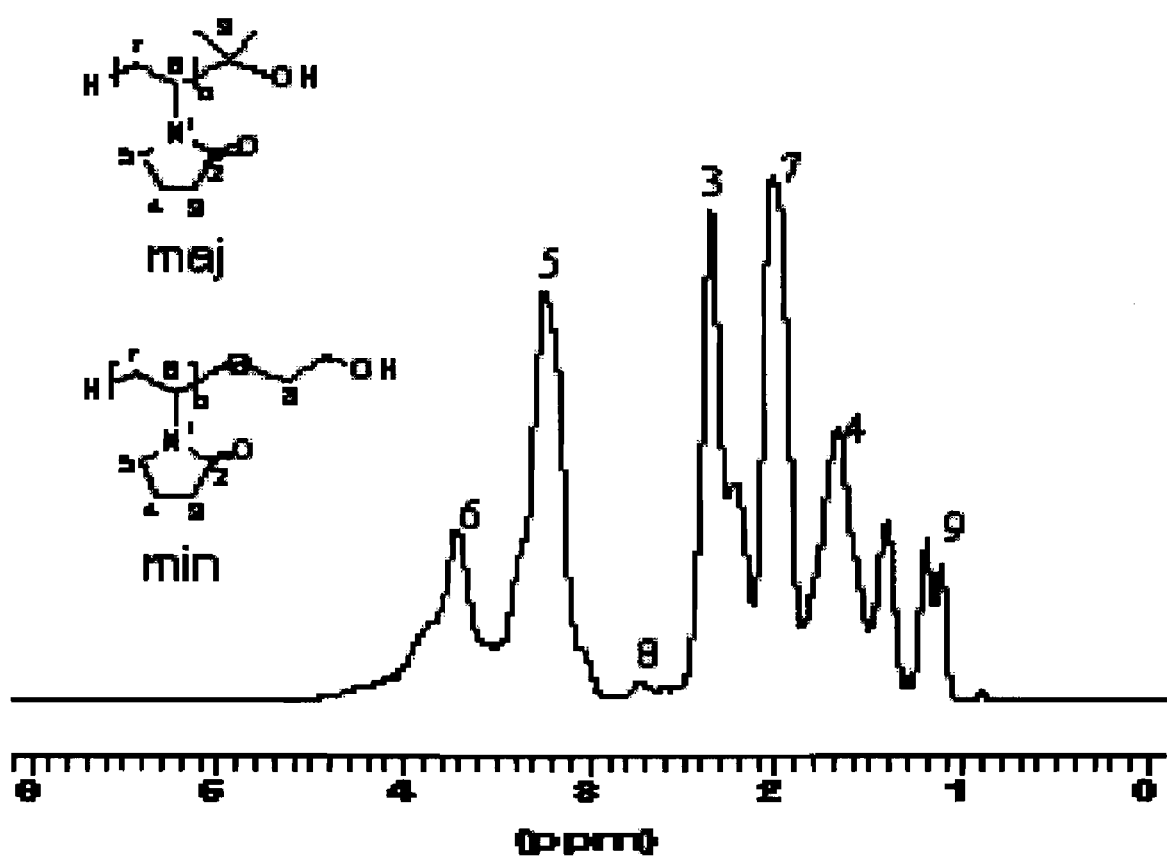
FIG. 1 shows NMR data from example 1 ($^1$H NMR (CDCl$_3$), δ (ppm). The product of step 1 is dried until the solvent peak disappears in NMR.

The synthesis of the diblock and triblock copolymers is a two-step polymerization process.

The first step is a free radical polymerization of VP, carried out in an alcoholic solvent such as methanol, ethanol, isopropanol, n-propanol, n-butanol, 2-butanol, tert-butanol, 1-pentanol and 2-pentanol. Ideally, the boiling point of the solvent is in the vicinity of the cracking temperature of the radical initiator. Isopropanol (IPA) is a preferred solvent. The presence of a radical initiator is required. The radical initiator is selected from the group of azo derivatives comprising 2,2'-azobis(2-methyl-N-(2-hydroxyethyl)-propionamide) (AMPAHE), 2,2'-azobis{2-methyl-N-[2-(1-Hydroxybutyl)]propionamide and 1,1'-azobis(cyclohexane-carbonitrile). The preferred initiators are those having hydroxyl end groups, with 2,2'-azobis(2-methyl-N-(2-hydroxyethyl)-propionamide) (AMPAHE) being the most preferred. Thiol derivatives such as 2-mercaptoethanol, 3-mercapto-1-propanol, 3-mercapto-2-propanol, 4-mercapto-1-butanol, 3-mercapto-2-butanol and 6-mercapto-1-hexanol can be used as chain transfer agents. The preferred chain transfer agent is 2-mercaptoethanol (MCE). The molecular weight can be controlled by adjusting the molar ratios of MCE, AMPAHE and IPA to VP. The resulting first block homopolymer PVP can be evaluated using techniques such as MALDI-TOF, SEC-LS, EA and NMR. PVP-OH is isolated by precipitation of its solution to an inert organic solvent with poor solubility for the polymer. The solvent or combination of solvents for dissolution is selected from the group comprising methanol, ethanol, IPA, acetone, 2-butanone, 4-methyl-2-pentanone, dichloromethane and tetrahydrofuran. The preferred solvents for dissolution are isopropanol and 4-methyl-2-pentanone, the use of which are illustrated in the examples herein. The inert organic solvent for precipitation is selected from the group comprising diethyl ether, tert-butyl methyl ether, hexane derivatives, heptane derivatives, ethyl acetate, isopropyl acetate, toluene and xylene derivatives. The preferred solvent for precipitation is tert-butyl methyl ether, the use of which is illustrated in the examples herein.

For the preparation of PVP-OH (first step of the process), once all reagents and solvent are charged, the reaction mixture is degassed prior to heating. The reaction temperature ranges from 60-140° C. depending on the initiator and solvent chosen. In a preferred embodiment of the invention, a combination of IPA as solvent, AMPAHE as initiator and MCE as chain transfer agent is used and the reaction is carried out at reflux. The reaction time ranges from 16 hours to 72 hours depending on the solvent, initiator and chain transfer agent. In the above preferred combination, a typical reaction time is between 30-48 hours.

It is important to ensure the dryness of the PVP-OH in order to succeed with the anionic ring opening polymerization in the next step. The drying of the polymer is performed using a vacuum oven with the temperature ramping towards 110° C. Alternatively, further drying can be optionally performed using azeotropic distillation with an inert solvent such as toluene, xylene derivatives or heptane derivatives prior to the second polymerization.

The second step is based on an anionic polymerization of cyclic ester, other cyclic lactone, methacrylate, or methacrylamide. This polymerization can be anionic via a macroinitiator or it can be catalyzed by aluminum or tin alkoxides. The macroinitiator is a metal PVP-hydroxylate obtained from the deprotonation of the terminal hydroxyl group with a metal hydride reagent such as sodium hydride or potassium hydride. The resulting second block is poly(ester) wherein the repeating unit is a lactide, ε-caprolactone, γ-caprolactone or other cyclic ester. The resulting second block also can be poly(amino acid), polymethacrylate, polymethacrylamide or their copolymers. The blocks of homopolymers are linked chemically by a covalent bond. The chemical linker between block homopolymers is a hydroxy derivative emerging from the radical initiator or chain transfer agent or an alcoholic solvent. An inert anhydrous aprotic solvent or combination of solvents such as tetrahydrofuran, toluene, diethyl ether, tert-butyl methyl ether can be used for the reaction, with tetrahydrofuran being preferred. The reaction temperature ranges from room temperature to about 70° C. with preferred temperature being 20-25° C. Upon completion of the reaction as evidenced by $^1$H NMR (solvent peak disappears), the reaction mixture is filtered and the block copolymer is isolated from the filtrate by precipitation into an inert organic solvent which has poor solubility for the polymer. Similar solvent systems as for the precipitation of PVP-OH are used, with tert-butyl methyl ether being the most preferred solvent. Optionally, any color of PVP block copolymers can be removed by charcoal treatment and a white to off-white powder of the product is obtained.

The invention is further illustrated by the following non-limiting examples.

EXAMPLE 1

Preparation of poly(N-vinyl-2-pyrrolidone) with a hydroxyl-bearing Chain End (PVP-OH)

SCHEME 1

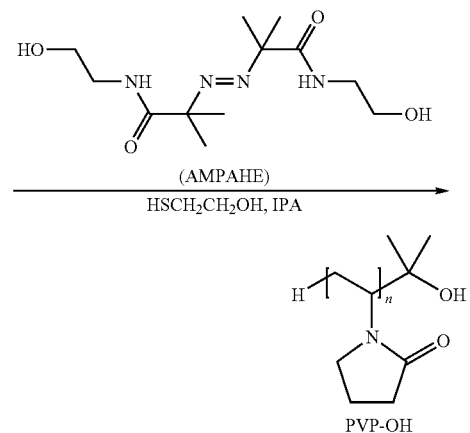

VP (200 g, 1.8 mol), AMPAHE (5.2 g, 0.018 mol) and MCE (5.0 mL, 0.072 mol) were dissolved in 3000 mL of IPA. The solution was degassed by nitrogen purge for 1 hour. The radical polymerization was carried out at reflux (about 89° C.) with stirring under a dry nitrogen atmosphere for 44 hours. Then, after cooling to room temperature, most IPA was removed under reduced pressure and 400 mL of MIBK were added. Afterwards, the polymer was slowly precipitated into 5000 mL of TBME. The suspension was filtered. The filter cake was washed twice with 200 mL of TBME. The white powder thus obtained was purified by solubilization in 400 mL of MIBK and 100 mL of IPA and re-precipitation from 5000 mL of TBME. Finally, the product was dried under vacuum (starting at room temperature then at 110° C., 1 torr) until disappearance of the solvent peak by NMR (FIG. 1). The PVP-OH was obtained as a white powder: 122 g. $M_n$: 2060, $M_w$: 2600, $M_w/M_n$: 1.3.

The instant inventors performed similar preparations of PVP-OH varying the different parameters such as the ratio of solvent/VP and the molar percentage of AMPAHE and MCE. Table 1 demonstrates that the molecular weight ($M_w$) and number-average molecular weight ($M_n$) of PVP-OH can be tuned effectively. The results showed also that the polydispersity index ($M_w/M_n$) is generally lower when MCE is present. Lower $M_w$ and $M_n$ are obtained when the solvent/VP ratio is higher.

TABLE 1

Characterization of PVP-OH prepared under various conditions

| Entry | VP (g) | AMPAHE (% mol) | MCE (% mol) | IPA/VP (volume ratio) | $M_n$ (gmol$^{-1}$) | $M_w$ (gmol$^{-1}$) | $M_w/M_n$ |
|---|---|---|---|---|---|---|---|
| 1 | 5 | 1.0 | ¾ | 10 | 10290 | 21300 | 2.1 |
| 2 | 5 | 1.0 | ¾ | 15 | 6760 | 15820 | 2.3 |
| 3 | 5 | 1.0 | ¾ | 20 | 6300 | 12460 | 2.0 |
| 4 | 20 | 0.5 | 1.0 | 10 | 5100 | 11600 | 2.3 |
| 5 | 50 | 1.0 | 2.0 | 12 | 4000 | 6220 | 1.6 |
| 6 | 50 | 1.0 | 2.0 | 16 | 2510 | 3470 | 1.4 |
| 7 | 15 | 1.0 | 4.0 | 12 | 3230 | 4520 | 1.4 |
| 8 | 200 | 1.0 | 4.0 | 15 | 2060 | 2600 | 1.3 |
| 9 | 50 | 1.0 | 4.0 | 16 | 2170 | 3190 | 1.5 |

EXAMPLE 2

Preparation of Diblock Copolymer poly(N-vinyl-2-pyrrolidone)-block-poly(DL-lactide) (PVP-PDLLA)

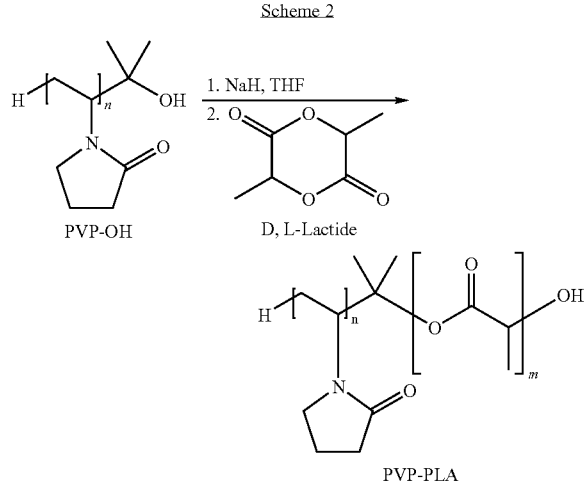

Scheme 2

Figure 2:
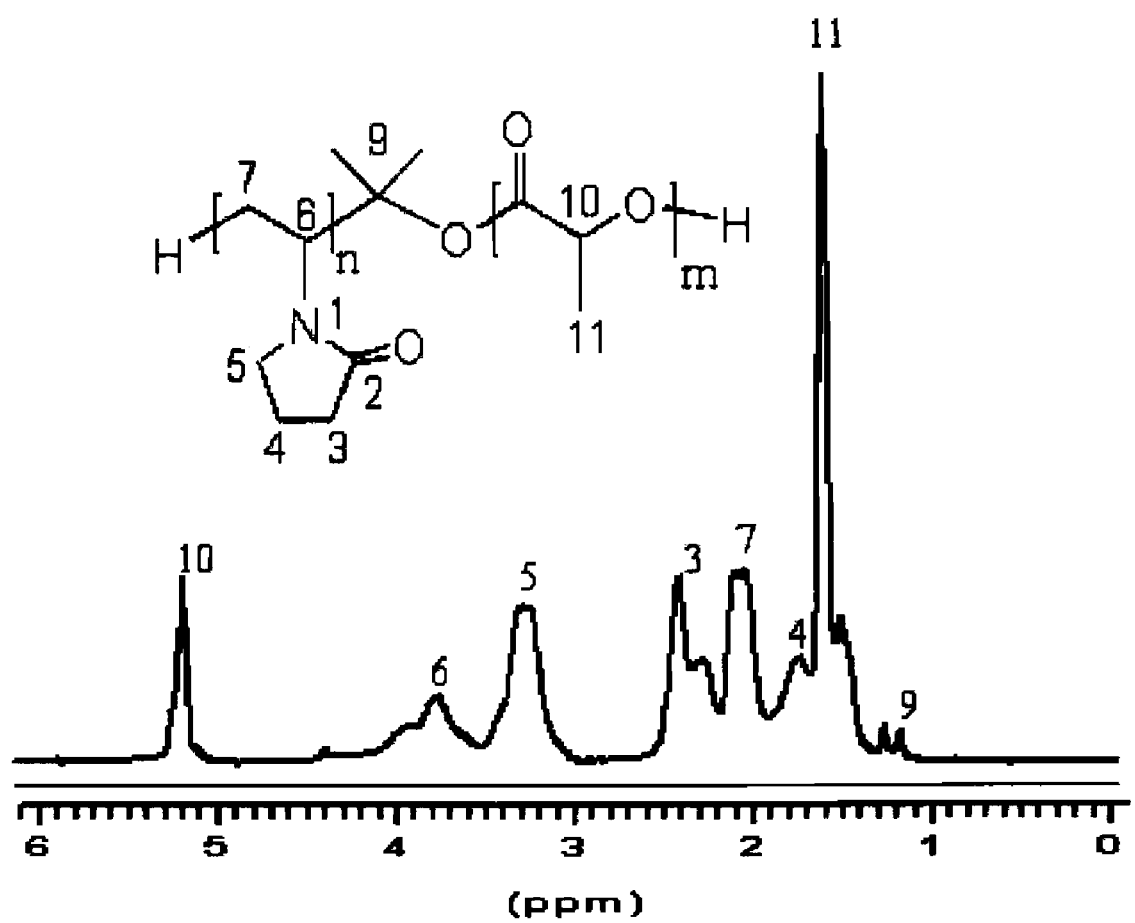
FIG. 2 shows NMR data from example 2 ($^1$H NMR (CDCl$_3$), δ (ppm). The product of step 2 is dried until the solvent peak disappears in NMR.

PVP-OH (100 g, 48.5 mmol, Mn=2060) was dissolved in 600 mL of anhydrous THF and sodium hydride 60 wt. % in mineral oil (3.0 g, 75 mmol) was added. The mixture was stirred for 30 minutes at room temperature and LA (125 g, 125% w/w) was then added. The anionic polymerization was carried out at room temperature with stirring under dry nitrogen atmosphere for 26 hours. Excess of sodium hydride was removed by filtration. The volume of filtrate was adjusted to 900 mL by addition of THF. Afterwards, the polymer solution was slowly precipitated into 4500 mL of TBME. The suspension was filtered. The filter cake was washed twice with 100 mL of TBME. The slightly yellow powder so obtained was purified by solubilization in 1215 mL of THF and 40.5 g of charcoal was added. The black suspension was stirred for 16 hours at room temperature then filtered over celite. The polymer was precipitated in 6000 mL of TBME. The suspension was filtered. The filter cake was washed twice with 100 mL of TBME and finally dried under vacuum until disappearance of the solvent peak by NMR (FIG. 2). The PVP-PDDLA was obtained as a white to off-white powder: 62 g. $M_n$: 3140, $M_w$: 3445, $M_w/M_n$: 1.1.

Empirical equations (Equation 1) and (Equation 2) were created to evaluate the molar percent PDLLA content by proton NMR and by Elemental Analysis, respectively.

Equation 1: Determination of PDLLA (% mol) Content by Proton NMR $$PLA(\% \text{ mol}) = \frac{I_{5.2\ ppm}}{\left[\frac{(I_{4.5-0.8\ ppm}) - 3 \times I_{5.2\ ppm}}{9_H}\right] + I_{5.2\ ppm}} \times 100 \quad (2)$$

Where $I_{5.2\ ppm}$ represents the integration of the signal at 5.2 ppm which corresponds to the tertiary proton on C-10. $I_{4.5-0.8PPM}$ represents the integration of the signals of the protons of the PVP-OH. The contribution of the linker is omitted.

Equation 2: Determination of PDLLA (% mol) content by Elemental Analysis (EA)

$$PLA(\% \text{ mol}) = \frac{7C - 36N}{7C - 18N} \times 100 \quad (1)$$

The block compositions of PVP and PDLLA correspond to the repeating unit of $C_6H_9NO$ and $C_3H_4O_2$, respectively. The PDLLA content (% mol) can be determined using equation (2) and based on the content of (c) and (N) atoms determined by EA.

Table 2 demonstrates the reproducibility of the molar percent PDLLA contents as well as the narrow polydispersity using the process.

TABLE 2

Preparation of PVP-PDLLA diblock copolymers according to Example 2

| Entry | $M_n$ PVP-OH used (gmol$^{-1}$) | $M_n$ SEC (gmol$^{-1}$) | $M_w$ SEC (gmol$^{-1}$) | $M_w/M_n$ SEC | PDLLA contents[A] (% mol) | PDLLA contents[B] (% mol) |
|---|---|---|---|---|---|---|
| 1 | 2060 | 3140 | 3445 | 1.1 | 38 | 48 |
| 2 | 1850 | 3350 | 3690 | 1.1 | 38 | 48 |
| 3 | 2220 | 3680 | 4050 | 1.1 | 37 | 48 |

[A] from equation 1, $^1$H-NMR
[B] from equation 2, EA ratio

Table 3 demonstrates that the molar contents of PDLLA in the diblock copolymer are influenced by the weight ration of Lactide/PVP-OH charged to the reaction. A desired PDLLA % content can be predictably obtained.

TABLE 3

Characterization of PVP-PDLLA diblock copolymers

| Entry | Lactide used (% w/w) | $M_n$ PVP-OH used (gmol$^{-1}$) | $M_n$ SEC (gmol$^{-1}$) | $M_w$ SEC (gmol$^{-1}$) | $M_w/M_n$ SEC | PDLLA contents[A] (% mol) | PDLLA contents[B] (% mol) |
|---|---|---|---|---|---|---|---|
| 1 | 90 | 2180 | 3145 | 4040 | 1.3 | 27 | 38 |
| 2 | 110 | 2165 | 3380 | 3720 | 1.1 | 35 | 42 |
| 3 | 125 | 2220 | 3680 | 4050 | 1.1 | 37 | 48 |

[A] from equation 1, $^1$H-NMR
[B] from equation 2, EA ratio

EXAMPLE 3

Synthesis of poly(N-vinylpyrrolidone) With a hydroxyl-bearing Chain End (PVP-OH)

Figure 3:
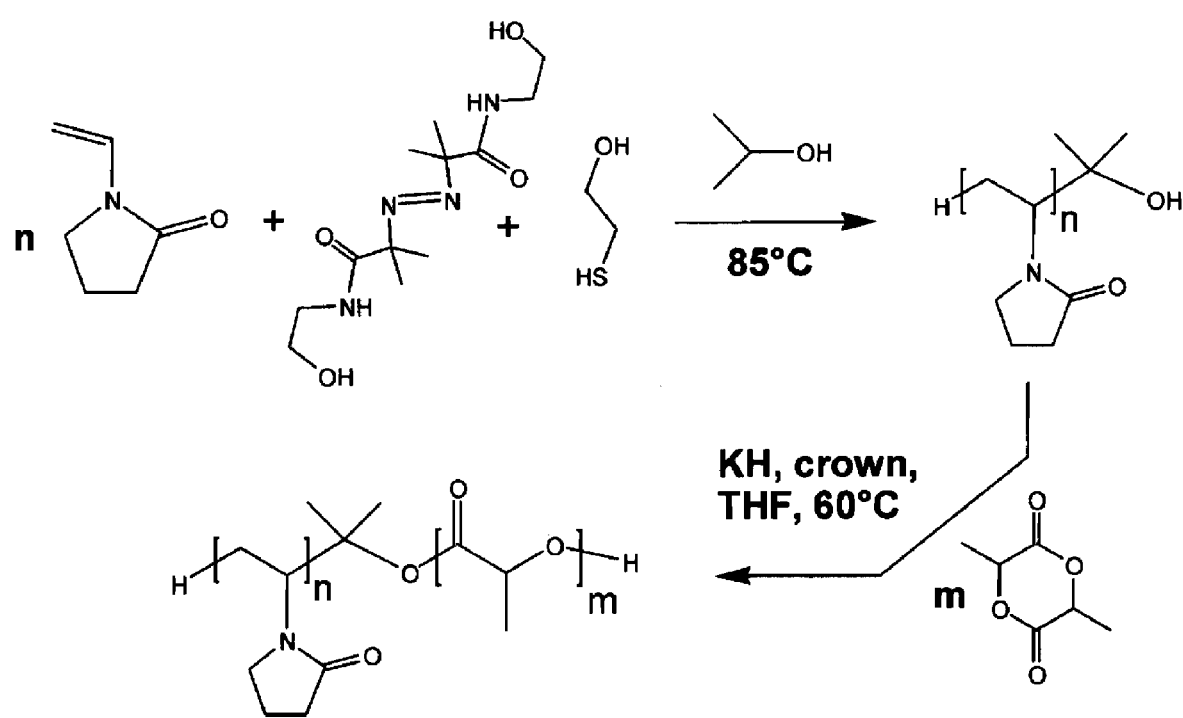
FIG. 3 illustrates the synthesis of PVP-OH homopolymer (first polymerization) and PVP-b-PDLLA diblock copolymer (second polymerization).

As shown in FIG. 3, PVP-OH was synthesized by free radical polymerization of VP. VP (30 g, 270 mmol), AMPAHE (0.7783 g, 2.7 mmol) and MCE (0.844 g, 10.8 mmol) were dissolved in 540 mL of IPA. The solution was degassed with argon for 15 minutes. The polymerization was carried out at 85° C. for 24 hours. Then, most of IPA was removed under reduced pressure. Afterwards, the polymer was precipitated in about 300 mL of diethyl ether. The polymer was dissolved in 60 mL of methylene chloride, and precipitated again in 300 mL of diethyl ether. Finally, the product (white powder) was transferred into a Whatman cellulose extraction thimble, and purified by diethyl ether Soxhlet extraction for 24 hours. The polymer was dried at 80° C. under vacuum overnight.

EXAMPLE 4

Synthesis of Diblock Copolymer poly(N-vinylpyrrolidone)-block-poly(D,L-lactide)

As illustrated in FIG. 3, PVP-b-PDLLA was synthesized by anionic polymerization of LA using PVP-OH as macro-initiator. PVP-OH $M_n$: 2500 (15 g, 5.77 mmol) was dissolved in 250 mL toluene. Using a Dean-Stark trap, all products were dried with toluene as azeotropic solvent. Toluene was then removed by distillation under reduced pressure. The polymer was dried under vacuum over $P_2O_5$ at 150° C. for 4 hours. After cooling down to room temperature, potassium hydride (KH, 0.346 mg, 8.65 mmol) in mineral oil was added into the flask under argon atmosphere. The flask was placed under vacuum again for 30 minutes. A volume of 75 mL freshly distilled and anhydrous THF was added to dissolve the mixture. After the polymer was dissolved, the solution was stirred for 10 minutes. LA (30 g, 20.8 mmol) and 18-crown-6 (2.29 mg, 8.65 mmol), both previously dried under vacuum at 80° C. for 4 hours, were placed in a flask and then, dissolved with a volume of 150 mL of anhydrous THF. The solution was transferred into the alcoholate solution under argon atmosphere, and stirred. The polymerization was carried out at 60° C. for 18 hours. PVP-b-PDLLA was precipitated in 1.2 L of cold diethyl ether. The polymer was collected and dried under vacuum at room temperature. PVP-b-PDLLA (20 g) was dissolved in 100 mL of DMF. 100 mL of deionized water was added to the polymer solution for micellization. The micelle solution was placed in dialysis bag (Spectrum, MW cutoff: 3500) and dialyzed against water (8 L) at 4° C. for 24 hours. Water was changed at least 4 times over that period. The aqueous solution was centrifuged at 11600 g at 4° C. for 30 minutes, and then filtered through a 0.2-hum filter. The filtered solution was collected and freeze-dried during 48 hours. The diblock copolymer was stored at −80° C. to avoid degradation.

EXAMPLE 5

Size-exclusion Chromatography

The SEC analysis was carried out on a Breeze Waters system using refractometer Waters 2410 (Milford, Mass.) and light-scattering (LS) detector Precision Detectors PD2000 (Bellingham, Mass.). LS data were collected at 15 and 90°. SEC was performed in DMF containing 10 mM LiBr. 200 μL of solution (about 3% w/v) was injected through a series of 3 columns Styragel® Waters HT2, HT3 and HT4 at a flow rate of 1.0 mL/min, in order to separate MW ranging from $10^2$ to $10^6$. The temperature of columns (separation) was maintained at 40° C., while the temperature of refractometer/LS detectors was set at 35° C. The instrument was calibrated with monodisperse polystyrene standards.

EXAMPLE 6

Nuclear Magnetic Resonance $^1$H- and $^{13}$C-NMR spectra were recorded on Varian 300 and Bruker AMX 600 spectrometers (Milton, Ontario) in $CDCl_3$ at 25° C. The PDLLA content (% mol) was determined using equation 1 (as noted in Example 2). Where $I_{5.2ppm}$ represents to signal intensity at 5.2 ppm, and corresponds to the tertiary proton (α-position of carbonyl group). This signal was normalized to 1. $^1$H-NMR was also performed in deuteriated water ($D_2O$) at 25° C. to evidence the presence of self-assembled micelle.

EXAMPLE 7

Elementary Analysis

EA was carried out in an oxidative atmosphere at 1021° C. Using a thermal conductivity probe, the amount of nitrogen oxide, carbonic acid, sulfur oxide ($NO_2$, $SO_2$ and $CO_2$) and water were quantified and provided the amount of nitrogen (N), carbon (C), hydrogen (H) and sulfur (S) atoms into the sample. The block compositions of PVP and PDLLA correspond to the repeating unit of $C_6H_9NO$ and $C_3H_4O_2$, respectively. The PDLLA content (% mol) was determined using equation 2 (as noted in Example 2) and based on the content of (C) and (N) atoms.

EXAMPLE 8

MALDI-TOF Spectrometry for Analysis of PVP

MALDI-TOF mass spectra were obtained with a Micromass TofSpec-2E mass spectrometer (Manchester, UK). The instrument was operated in positive ion reflectron mode with an accelerating potential of +20 kV. Spectra were acquired by averaging at least 100 laser shots. Dithranol was used as a matrix and chloroform as a solvent. Sodium iodide was dissolved in methanol and used as the ionizing agent. Samples were prepared by mixing 20 μL of polymer solution (6-8 mg/mL) with 20 μL of matrix solution (10 mg/mL) and 10 μL of a solution of ionizing agent (2 mg/mL). Then 1 mL of these mixtures was deposited on a target plate and the solvent was removed in a stream of nitrogen. An external multipoint calibration was performed by using bradykinin (1060.2 g/mol), angiotensin (1265.5 g/mol), substance P (1347.6 g/mol), renin substrate tetradecapeptide (1759.0 g/mol), and insulin (5733.5 g/mol) as standards.

EXAMPLE 9

Viscosity-average Molecular Weight ($M_v$) Determination of PVP

The limiting viscosity number "K-value" (or Fikentscher K-value) of homopolymer PVP-OH was determined in accordance with BASF protocol (US Pharmacopoeia) using Ubbelohde viscometer Type la. With the K-value, $M_v$, is directly obtained from the following equation: $M_v=22.22(K+0.075K^2)^{1.69}$

EXAMPLE 10

Critical Association Concentration (CAC)

CAC was measured by the steady-state pyrene fluorescence method (Benahmed et al. Pharm. Res. 18:323-328 2001). The procedure is described briefly as follows. Several polymeric solutions in water containing $10^{-7}$ M of pyrene were prepared and stirred overnight in the dark at 4° C. Steady-state fluorescent spectra were measured ($\lambda_{ex}$, =390 nm) after 5 minutes under stirring at 20° C. using a Series 2 Aminco Bowman fluorimeter (Spectronic Instruments Inc., Rochester, N.Y.). Experiments were run in duplicate.

EXAMPLE 11

Dynamic Light-scattering (DLS)

DLS was used for the determination of particle size in water. For this analysis, a series of aqueous solutions of PVP-b-PDLLA with concentrations of 0.5, 1 and 2 mg/mL was prepared by dissolving the polymer directly in water. The solutions were analyzed with a Malvern instrument Autosizer 4700 (Mississauga, Ontario). Each measurement was carried out in triplicata at 25° C. at an angle of 90° C. The size distribution of particles and the intensity mean size were recorded.

EXAMPLE 12

Thermogravimetry Analysis (TGA)

TGA measurements were collected on a TA Instrument Hi-Res TGA 2950 Thermogravimetric Analyser (New Castle, Del.).

About 1 mg of polymer was used for the experiments. Temperature ramp was 20° C./minutes between room temperature and 700° C. The residual amount of water was quantified after freeze-drying. PDLLA and PVP contents (% w/w) in diblock copolymer were also analyzed.

Experimental Results from Examples

Mercapto compounds are good chain transfer agents capable of functionalizing chain ends and controlling indirectly polymer molecular weight (Ranucci et al. Macromol. Chem. Phys. 196:763-774 1995; Ranucci et al. Macromol. Chem. Phys. 201:1219-1225 2000; Sanner et al. Proceedings of the International Symposium on Povidone; University of Kentucky: Lexington, Ky., page 20, 1983). A Hydroxyl group can be introduced at the end of polymer chains by using MCE as CTA in free radical polymerization of vinyl monomers. However, it was reported that when VP was radically polymerized in the presence of mercapto derivatives, only a small fraction of functionalized short oligomers was obtained. Moreover, a large amount of high MW polymers without terminal functionality was found in the product. This was due to the high transfer constant of thiol to VP (Ranucci et al. Macromol. Chem. Phys. 196:763-774 1995; Ranucci et al. Macromol. Chem. Phys. 201:1219-1225 2000). In the free radical polymerization of VP, radicals can transfer to solvent and possibly to a monomer. Hence, functionalized PVP had been synthesized using particular solvents (i.e. isopropoxyethanol). However, the functionality of PVP was not under control quantitatively (Ranucci et al. Macromol. Chem. Phys. 196:763-774 1995; Ranucci et al. Macromol. Chem. Phys. 201:1219-1225 2000). In order to get quantitative hydroxyl-terminal PVP homopolymers and also to control their molecular weight profile, IPA, MCE and a hydroxyl-bearing azo initiator (AMPAHE) have been all combined in the instant invention for the radical polymerization of VP (see FIG. 3).

Figure 4:
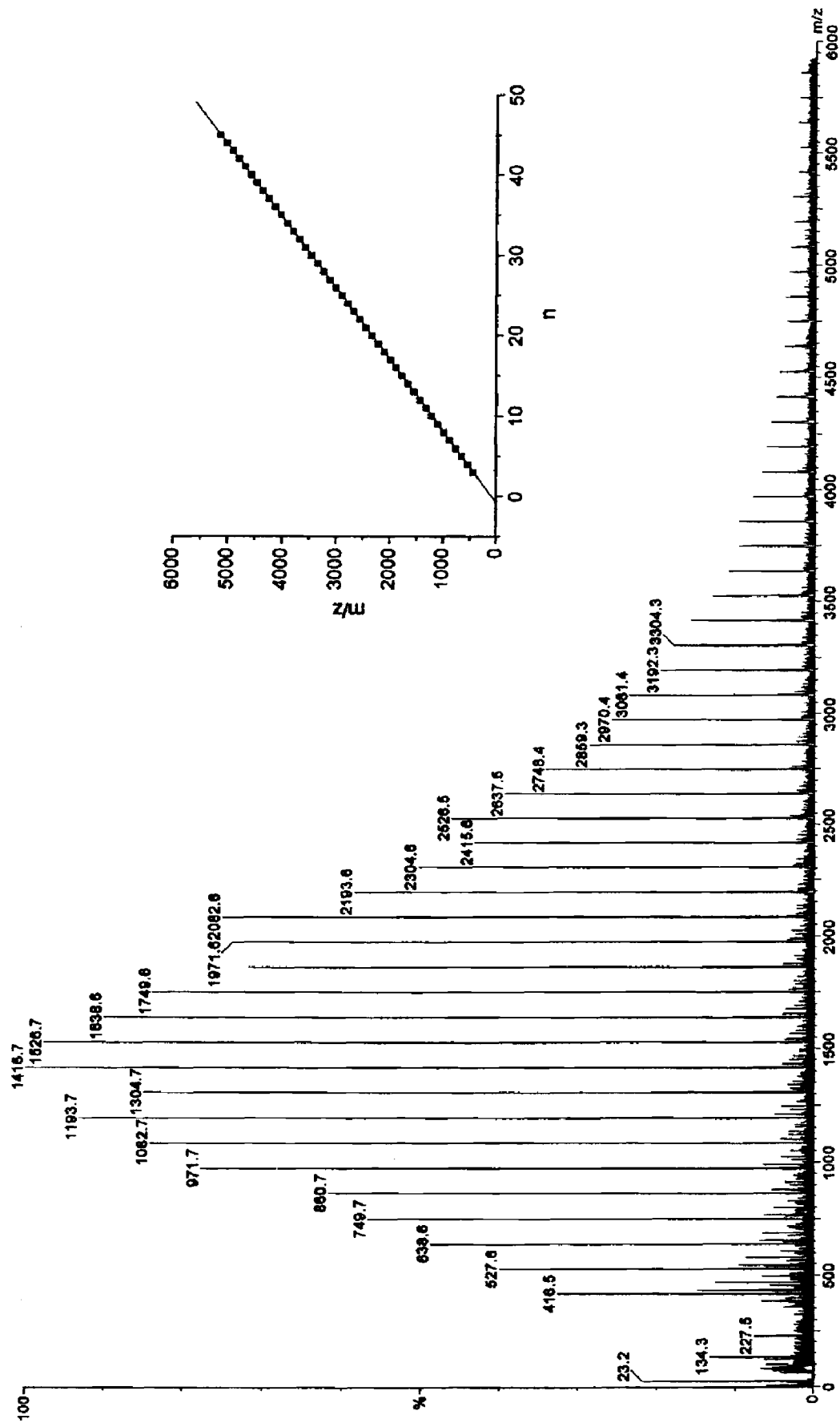
FIG. 4 shows a spectrum resulting from MALDI-TOF spectrometry (example 8). MALDI-TOF analysis is useful for evaluation of the hydroxyl groups of PVP-OH.

As shown in FIG. 4, MALDI-TOF spectrometry showed that the majority of PVP chains (>95%) bore a hydroxyl group at one chain end of PVP. FIG. 4 shows a MALDI-TOF spectrum of PVP-OH-2500. Most chains featured a 2-hydroxyisopropyl group at the end, meaning that the solvent was the main specie initiating polymer growth. Using diluted conditions of polymerization, MALDI-TOF data suggests that no significant termination by bimolecular combination occurred during the reaction, because the mass of chain end was only that of IPA plus the sodium ion ($59_{IPA}+23_{NA}+=82$, at n equals 0 in the linear equation). Two other distributions were also observed, which were attributed to PVP bearing MCE and VP as chain end, respectively. These distributions were only significant at low values of m/z (<1000 g mol$^{-1}$) and represented less than 5% of the spectrum, related to MCE- and VP-terminated chains. Since MCE is more efficient as a chain transfer agent than IPA, all the MCE were consumed early in the reaction. Previous syntheses of PVP in THF (instead of IPA) using MCE have shown that radicals may also transfer directly to monomers (Ranucci et al. Macromol. Chem. Phys. 196:763-774 1995; Ranucci et al. Macromol. Chem. Phys. 201:1219-1225 2000). In consequence, by combining MCE and IPA as CTA, the synthesis of low MW PVP could be achieved with the quantitative insertion of hydroxyl group on one chain end.

The molecular weights of PVP-OH were determined by SEC and viscometry (Table 4). Polydispersity indexes (PI) of about 1.5 indicated that radial transfers prevailed over bimolecular combination, being consistent with MALDI-TOF data. Results from SEC and viscometry were in good agreement. $M_v$ might be slightly overestimated because the universal equation established by BASF referred to a wide range of PVP MW ($10^3$ to $10^6$). Mark-Houwink constants (K and α) of low MW polymers differ from those having very high MW, which may explain this overestimation. Analysis of PVP-OH by EA revealed that the weight ratios of N/C atoms in all PVP-OH were similar to the theoretical number (0.194).

TABLE 4

Characterization of hydroxyl-terminated PVP homopolymers.

| Polymers | $M_n$ SEC (g mol$^{-1}$) | $M_w$ SEC (g mol$^{-1}$) | $M_w/M_n$ SEC | $M_v$ Viscometer (g mol$^{-1}$) | N/C EA |
|---|---|---|---|---|---|
| PVP-OH-2300 | 2300 | 3600 | 1.56 | 5400 | 0.192 |
| PVP-OH-2500 | 2500 | 4000 | 1.60 | 5500 | 0.190 |
| PVP-OH-4000 | 4000 | 7400 | 1.85 | 9000 | 0.193 |
| PVP-OH-6100 | 6100 | 9600 | 1.57 | 11100 | 0.197 |

Molecular weight profile of PVP-OH was controlled by changing ratios of both MCE (the CTA) and IPA, to VP monomer. As expected, the molecular weights of PVP-OH decreased when either CTA/VP or IPA/VP ratios increased (FIGS. 5A-B). In FIG. 5A the ratios of IPA/VP are fixed at (■) 18 mL/g and (●) 15 mL/g. In FIG. 5B the ratio of MCE/VP is fixed at (▲) 2.5%.

Figure 6:
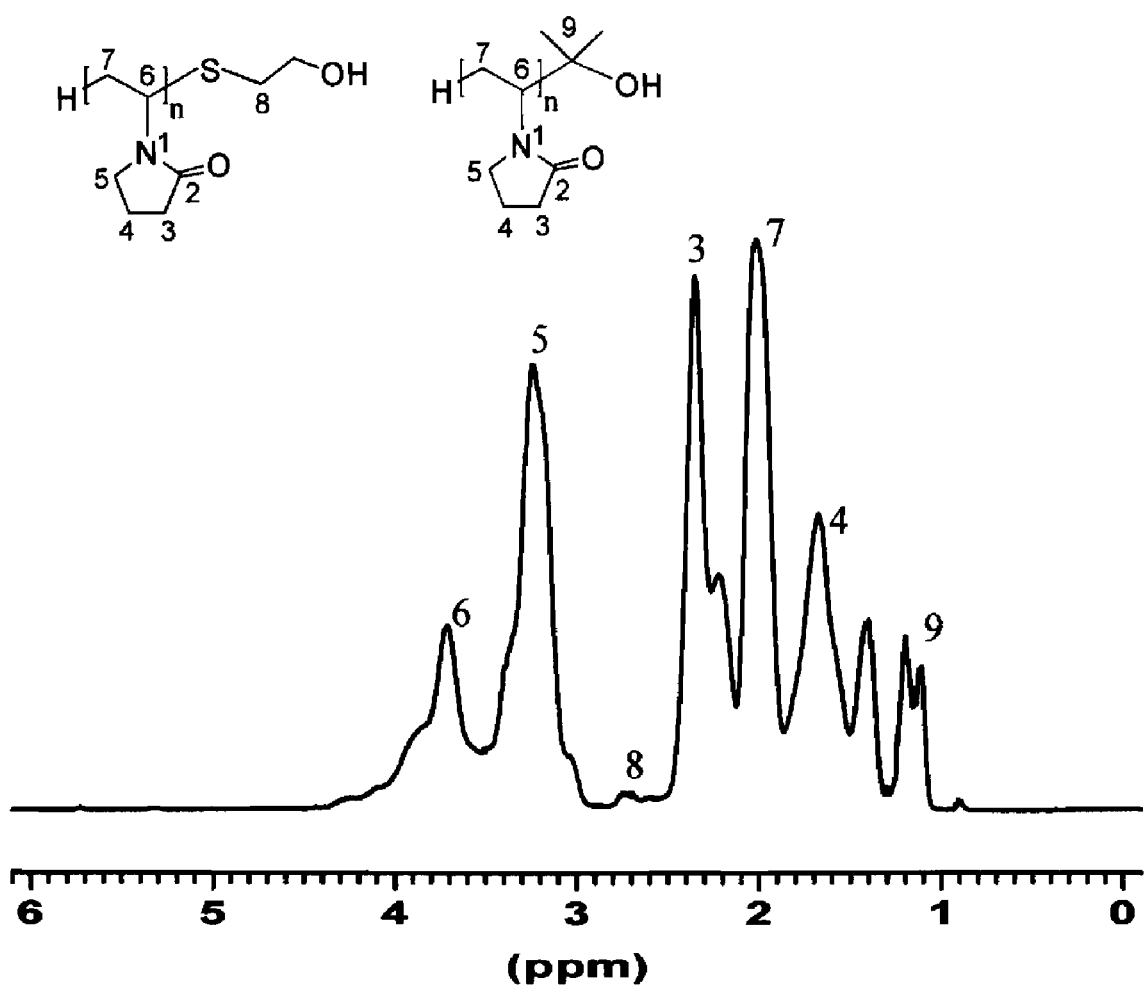
FIG. 6 shows a $^1$H NMR spectrum of PVP-OH-2500 in CDCl$_3$ (example 6).

The $^1$H NMR spectrum of PVP-OH-2500 in CDCl$_3$ is shown in FIG. 6. The chemical shifts of the methylene groups of MCE are 2.7 and 3.8 ppm. When MCE was introduced at the end of the PVP-OH chains by forming S—C bond instead of S—H bond, the peaks of one methylene group appear at 2.7 and 2.75 ppm instead of 2.7 ppm, and the signal located around 3.8 ppm is overlapped with the peaks of PVP-OH in the spectrum. Signals between 1.1 and 1.3 ppm are assigned to the methyl protons of the 2-hydroxyisopropyl group (IPA fragment). These results suggest that PVP radicals transferred to both MCE and IPA, and this is in agreement with the results obtained from MALDI-TOF spectrometry.

Potassium hydroxylate derivatives are widely used for anionic ring-opening polymerization of LA (Nagasaki et al. Macromolecules 31:1473-1479 1998; Iijima et al. Macromolecules 32:1140-1146 1999; Yasugi et al. Macromolecules 32:8024-8032 1999). In the instant invention, the reaction between the OH group at the chain end of PVP-OH and potassium hydride produced potassium PVP-hydroxylate as macroinitiator for the polymerization of LA. Water and alcohol molecules in the reaction system may initiate the formation of free PDLLA homopolymer. Since there are strong hydrogen bonds between PVP and water as well as alcohol, shown in FIG. 7A. The peak at 5.2 ppm corresponds to the —CH— group of PDLLA. Signals from 0.8 ppm to 4.5 ppm were assigned to all protons associated to PVP segment, which overlap the peak of PDLLA methyl group (1.4 ppm). PDLLA content was calculated using equation 1, and results are presented in Table 5. Since traces of water in PVP-b-PDLLA copolymers slightly overestimated the integration of PVP signals, EA was performed and the amount of nitrogen and carbon atoms were used for the calculation of PDLLA content using equation 2. As shown in equation 2 hydrogen atoms of moisture, even from the polymer, are not taken in account into the calculation of PDLLA content by EA. Contrary to $^1$H-NMR analysis, EA results were quite constant and reproducible regardless of the moisture content. EA analysis turned out to be suitable for the quantification of PDLLA content into PVP-b-PDLLA. Actually, PDLLA content from NMR data was usually 6 to 8% less than that determined by EA. Although SEC resulted in higher PDLLA contents (about 5%) than EA, the consistence between EA, SEC and NMR were quite good (Table 5).

TABLE 5

Characterization of PVP-b-PDLLA diblock copolymers.

| PVP-b-PDLLA$^A$ | PVP-OH used | $M_n$ SEC (g mol$^{-1}$) | $M_w$ SEC (g mol$^{-1}$) | $M_w/M_n$ SEC | PDLLA NMR$^B$ % mol | PDLLA EA$^C$ % mol | PDLLA SEC$^D$ % mol |
|---|---|---|---|---|---|---|---|
| Diblock-47 | PVP-OH-2500 | 4380 | 5000 | 1.14 | 38 | 47 | 54 |
| Diblock-35 | PVP-OH-2500 | 3840 | 5030 | 1.30 | 27 | 35 | 45 |
| Diblock-37 | PVP-OH-6100 | 8290 | 10360 | 1.39 | 32 | 37 | 36 |
| Diblock-39 | PVP-OH-4000 | 6070 | 8960 | 1.48 | 34 | 39 | 44 |
| Diblock-45 | PVP-OH-2300 | 3770 | 4860 | 1.29 | 37 | 45 | 50 |

$^A$labeling based on PDLLA content into PVP-b-PDLLA diblock copolymers, obtained from EA.
$^B$from equation 1
$^C$from equation 2
$^D$from the $M_n$ of PVP-OH and its corresponding PVP-b-PDLLA residues of these protic solvents, which interact with the polymer are difficult to remove (Haaf et al. Polymer J. 17:143-152 1985). In the present case, low MW PVP-OH were synthesized in IPA. Therefore, traces of IPA and water molecules might be contained in the polymer. Two drying steps were required for solvent removal. Briefly, at first, PVP-OH was dissolved in toluene and then, an azeotropic distillation was made. Then, the polymer was dried under vacuum at 150° C. over $P_2O_5$, for 4 hours. The polymer was actually molten under these conditions, and resulted in a highly dried material.

Molecular weight and PI of PVP-b-PDLLA were determined by SEC using light-scattering and a differential refractometer as detectors (Table 5). As expected, PVP-b-PDLLA MWs were larger than that of corresponding PVP-OH, while PI decreased. Anionic polymerization leads to very small PI {Nagasaki et al. Macromolecules 31:1473-1479 1998; Iijima et al. Macromolecules 32:1140-1146 1999; Yasugi et al. Macromolecules 32:8024-8032 1999). Therefore, the second polymerization step might decrease the PI of the diblock copolymer, suggesting that resulting materials were diblock copolymers and not a mixture of homopolymers. Another plausible explanation of lower PI was that PVP-b-PDLLA having shortest PVP chains were removed by the precipitation in diethyl ether.

Figure 8:
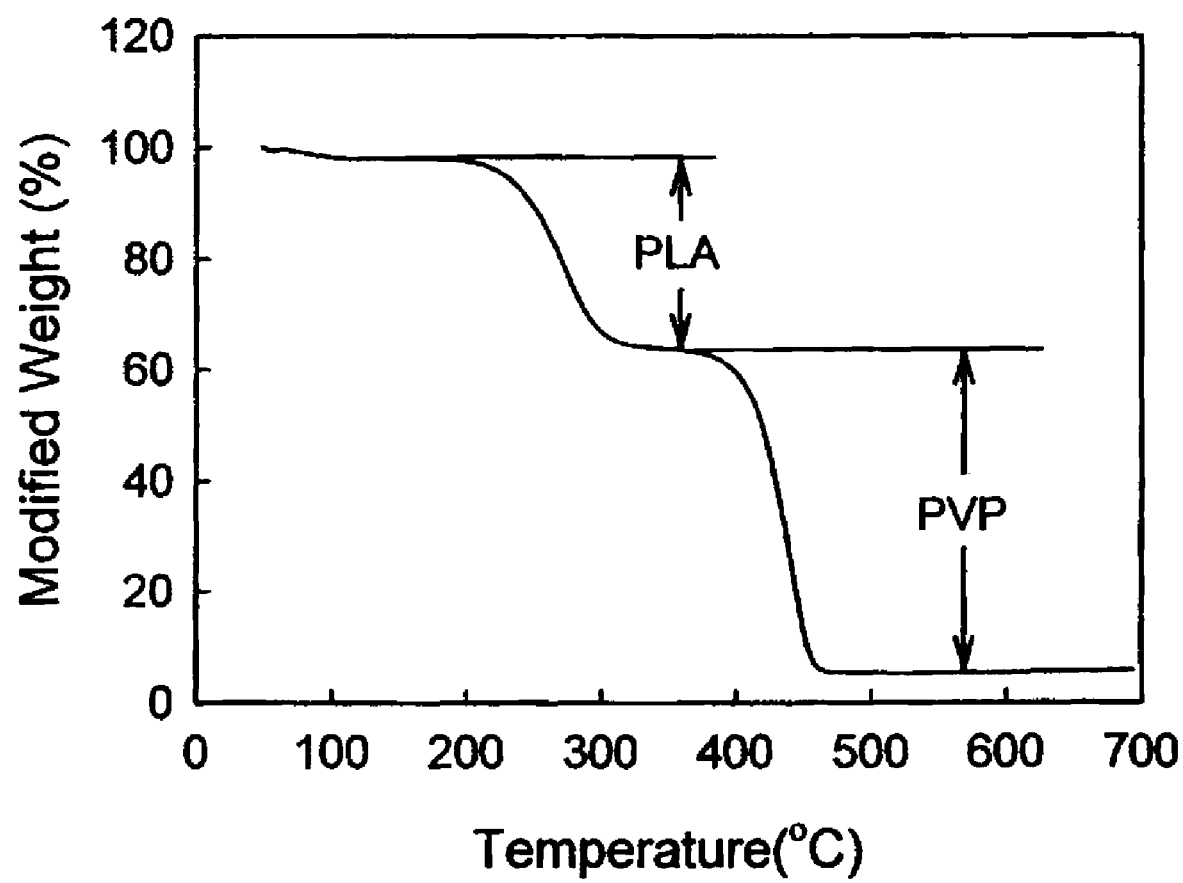
FIG. 8 shows a thermogravimetric profile of PVP-b-PDLLA diblock copolymer (Diblock-47).

The PDLLA contents (% mol) in the diblock copolymers was determined by $^1$H-NMR, EA and SEC. A $^1$H-NMR spectrum of PVP-b-PDLLA (Diblock-47) copolymer in CDCl$_3$ is Thermogravimetry (TGA) was also a good method for characterizing the diblock copolymer (Liggins et al. Adv. Drug Deliv. Rev. 54:191-202 2002). As shown in FIG. 8, the trace of solvents (less than 4%) in the diblock polymer was removed below 100° C. FIG. 8 shows a thermogravimetric profile of PVP-b-PDLLA diblock copolymers (Diblock-47). PDLLA in the diblock copolymer was then degraded between 200 to 350° C., followed by the degradation of PVP from 350 to 480° C. Hence, the PDLLA content could also be determined by TGA. For instance, TGA of diblock-45 revealed a PDLLA content of 48% mol, which was in good agreement with EA results.

Figure 9:
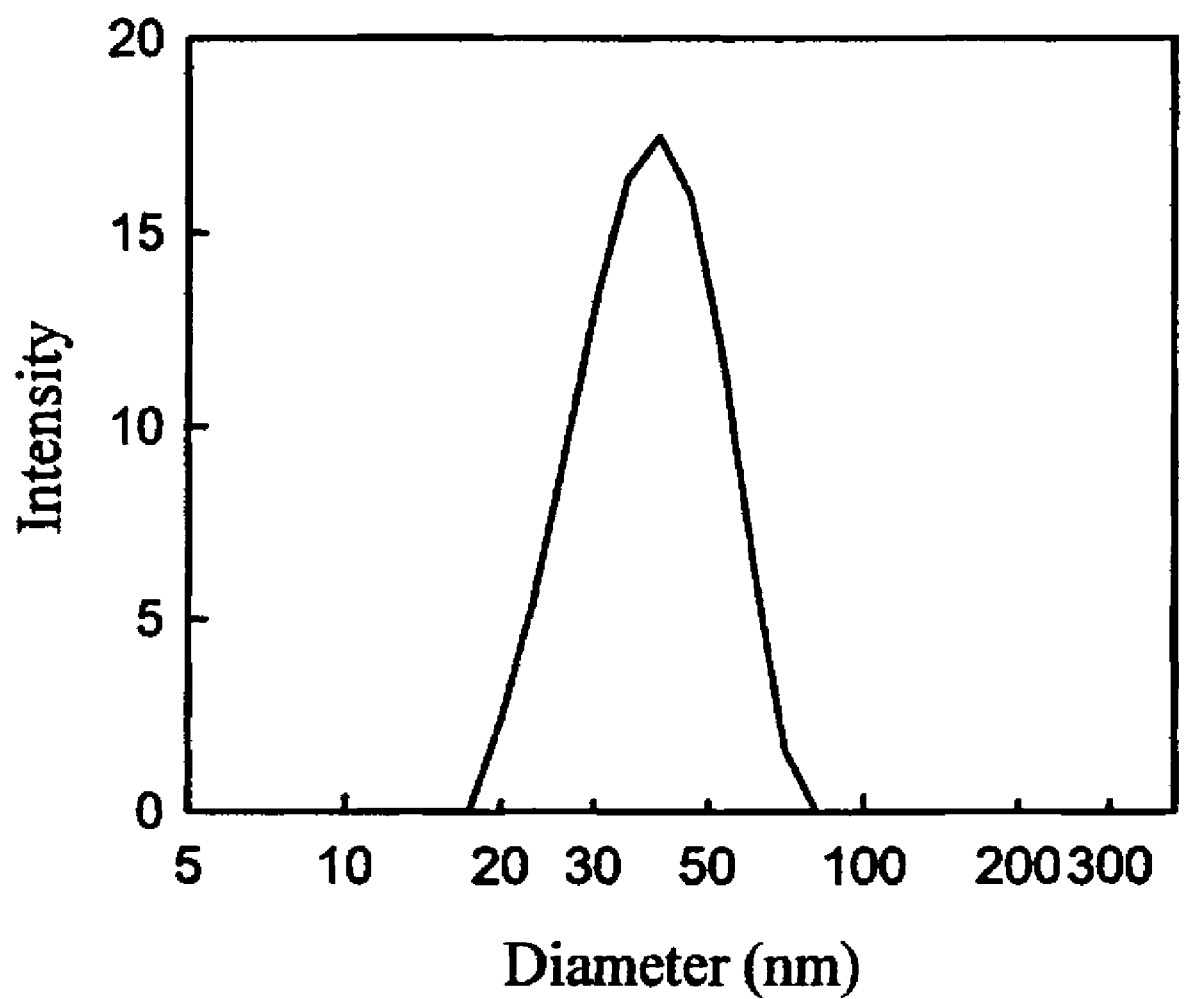
FIG. 9 shows the size distribution of micelles composed of PVP-b-PDLLA (Diblock-47) in water measured by DLS.

Because of their amphiphilic properties, the well-defined PVP-b-PDLLA diblock copolymers can self-assemble in aqueous solution to form micelles. The size of micelles was measured by DLS at different concentrations. As shown in FIG. 9, micelles composed of PVP-b-PDLLA (Diblock-47) in water at a concentration of 2 mg/mL feature a single narrow size distribution of about 40 nm. FIG. 9 shows size distribution of micelles composed of PVP-b-PDLLA (Diblock-47) in water measured by DLS. Upon dilution towards 0.5 mg/mL, no change in the size of micelles was observed. The results indicate that there is no micelle aggregation in the solutions. In contrast, Benahmed et al. (C. Pharm. Res. 18:323-328 2001) reported bimodal size distributions for PVP-b-PDLLA micelles. It has been suggested that the larger population reflects the aggregation of small individual micelles, governed by a secondary order of aggregation. The plausible explanation of the difference is that the molecular weights, PDLLA contents and polydispersity indices reported in Benahmed et al. were higher than the polymers described in the instant application.

Figure 10:
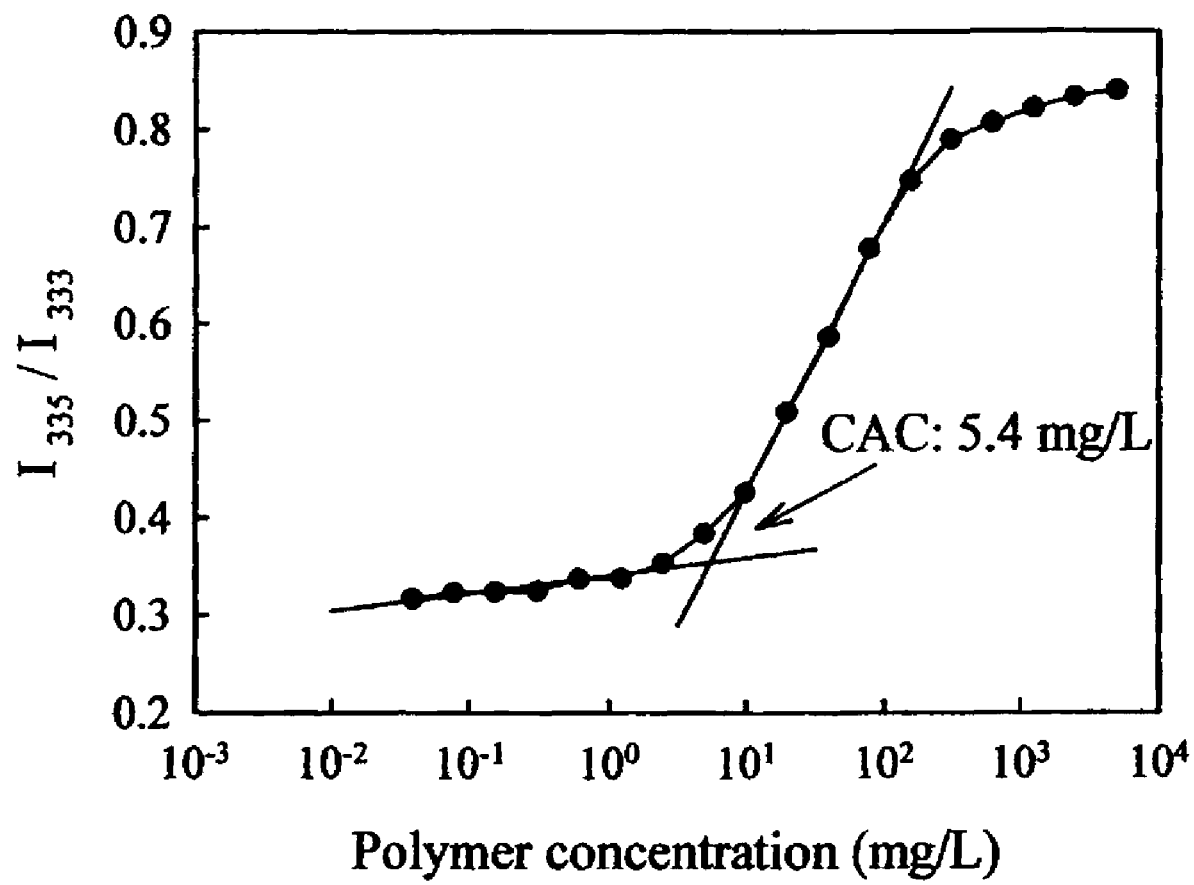
FIG. 10 shows data for determination of CAC of PVP-b-PDLLA (Diblock-47) in water at 25° C.

Steady-state fluorescence, using pyrene as hydrophobic fluorescence probe, is well used as technique to show the formation of micelles (Zhao et al. Macromolecules 30:7143-7150 1997; Kabanov et al. Macromolecules 28:2303-2314 1995; Wilhelm et al. Macromolecules 24:1033-1040 1991). The polarity of the surrounding environment of the probe molecules affects some vibrational bands in the fluorescence emission spectrum. The changes in the relative intensity of the first and the third vibrational bands ($I_{338}/I_{333}$), which is due to the shift of the (0,0) band from 333 to 338 nm in the emission spectrum have been suggested to examine the polarity of the microenvironment. The CAC of micelles can be determined by this method. After micellar formation, pyrene partitions into the micellar phase and the water phase. Since the core of the micelle is hydrophobic, the intensity ratio of $I_{338}/I_{333}$ is changed. The extrapolation of tangent of the major change in the slope of the fluorescence intensity ratio leads to CAC. As illustrated in FIG. 10, PVP-b-PDLLA copolymers exhibited a CAC of about 6 mg/L. FIG. 10 shows the determination of CAC of PVP-b-PDLLA (Diblock 47) in water at 25° C.

Figures 7A, 7B:
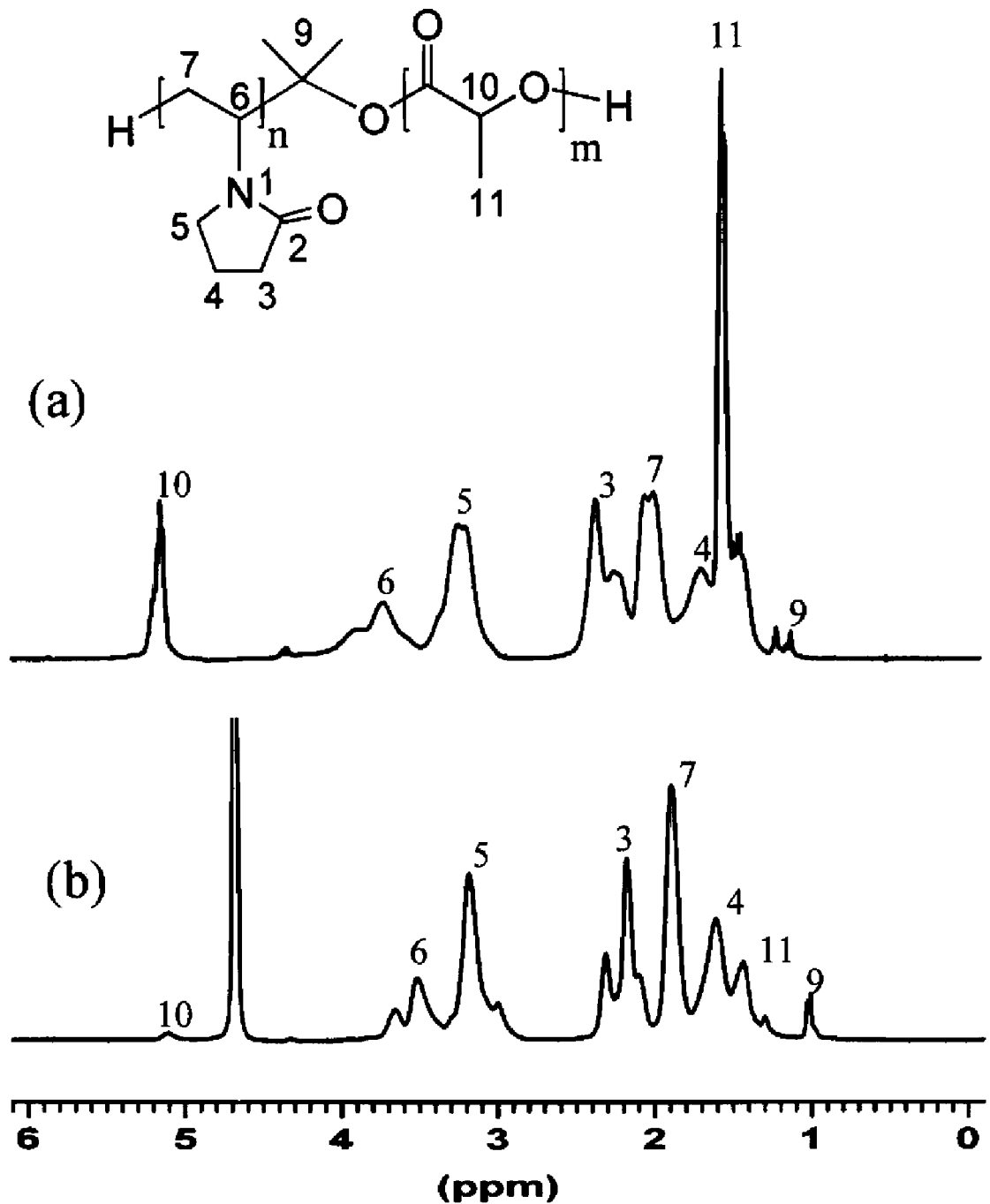
FIGS. 7A-B show $^1$H NMR spectra of PVP-b-PDLLA (Diblock-47) in CDCl$_3$ (FIG. 7A) and in D$_2$O (FIG. 7B).

The micellization of PVP-b-PDLLA also can be assessed by $^1$H-NMR in $D_2O$ (Benahmed et al. C. Pharma. Res. 18:323-328 2001; Yamamoto et al. J. Controlled Release 82:359-371 2002; Heald et al. Langmuir 18:3669-3675 2002). FIG. 7B shows an $^1$H-NMR spectrum of PVP-b-PDLLA (Diblock-47) in $D_2O$. As is shown in FIG. 7B, the peaks of the methyl protons (—$CH_3$) and the methine proton (CH—) of PDLLA are highly suppressed while the peaks of PVP still appear in the spectrum, providing evidences of the formation of core-shell structures. The mobility of PDLLA chains in the core is highly restricted, resulting in masking of the PDLLA signals. On the other hand, PVP chains are still observed by $^1$H-NMR because of their high mobility as outer shell of micelles.

By combining MCE and IPA as chain transfer agents, PVP bearing one terminal hydroxyl group on one extremity was successfully synthesized by the first polymerization step of the process of the instant invention. PVP MWs were efficiently controlled by changing ratios of either MCE or IPA, to VP. Terminally functionalized low MW PVP were used to efficiently synthesize the PVP-b-PDLLA diblock copolymer by anionic ring-opening polymerization of D,L-lactide in the second polymerization step of the process of the instant invention. PVP-b-PDLLA self-assembled into micelles in water. These micelle-forming copolymers presented very low CAC of a few mg/L, leading to the formation of 40-nm polymeric micelles. These polymeric self-assemblies based on low molecular weight PVP blocks are useful as drug carriers for parenteral administration.

All patents and publications mentioned in this specification are indicative of the levels of those skilled in the art to which the instant invention pertains. All patents and publications are herein incorporated by reference to the same extent as if each individual patent and publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. The methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed various modifications of the described modes for carrying out the invention which are obvious to those skilled in the art are intended to be within the scope of the following claims.

What is claimed is:

1. A process for preparing diblock and triblock copolymers comprising the steps of:
   (a) performing radical polymerization of N-vinyl-2-pyrrolidone in the presence of a radical initiator, a chain transfer agent and an alcoholic solvent to form hydroxy-terminated poly (N-vinylpyrrolidone) wherein said hydroxy-terminated poly (N-vinylpyrrolidone) is isolated by dissolution and precipitation and
   (b) performing ionic polymerization of monomers or comonomers selected from the group consisting of 3,6-dimethyl-1,4-dioxane-2,5-dione, ε-caprolactone and γ-caprolactone in the presence of a base and a macroinitiator wherein said macroinitiator is the hydroxy-terminated poly (N-vinylpyrrolidone) formed in step (a) thereby preparing said diblock and triblock copolymers, wherein said copolymers self-assemble in polymeric micelles or stabilized nanoparticles in aqueous solution.

2. The process in accordance with claim 1 wherein said alcoholic solvent is selected from the group consisting of methanol, ethanol, isopropyl alcohol, n-propanol, n-butanol, 2-butanol, tert-butanol, 1-pentanol and 2-pentanol.

3. The process in accordance with claim 1 wherein said chain transfer agent is a thiol derivative selected from the group consisting of 2-mercaptoethanol, 3-mercapto-1-propanol, 3-mercapto-2-propanol, 4-mercapto-1-butanol, 3-mercapto-2-butanol and 6-mercapto-1-hexanol.

4. The process in accordance with claim 1 wherein said radical initiator is an azo derivative selected from the group consisting of 2,2'-azobis (2-methyl-N-(2-hydroxyethyl)-propionamide), 2,2'-azobis [2-methyl-N-(2-(1-hydroxybutyl)]-propionamide and 1,1'-azobis(cyclohexane-carbonitrile).

5. The process in accordance with claim 1 wherein said base is potassium or sodium hydride.

6. The process in accordance with claim 1 wherein said poly (N-vinylpyrrolidone) formed in step (a) comprises a hydroxyl group on at least one chain end.

7. The process in accordance with claim 1 wherein the solvent for said dissolution is selected from the group consisting of methanol, ethanol, isopropanol, acetone, 2-butanone, 4-methyl-2-pentanone, dichloromethane and tetrahydrofuran.

8. The process in accordance with claim 7 wherein at least two solvents are combined for said dissolution.

9. The process in accordance with claim 1 wherein the solvent for said precipitation is selected from the group consisting of diethyl ether, tert-butyl methyl ether, hexane derivatives, heptane derivatives, ethyl acetate, isopropyl acetate, toluene and xylene derivatives.

10. The process in accordance with claim 9 wherein at least two solvents are combined for said precipitation.

11. The process in accordance with claim 1 wherein said poly (N-vinylpyrrolidone) formed in step (a) is dried under vacuum at a final temperature over 100° C.

12. The process in accordance with claim 1 wherein said poly (N-vinylpyrrolidone) formed in step (a) is dried by azeotropic distillation using an inert organic solvent.

13. The process in accordance with claim 12 wherein said inert organic solvent is selected from the group consisting of toluene, xylene derivatives and hepatane derivatives.

14. The process in accordance with claim 1 wherein said diblock and triblock copolymers are isolated by precipitation using an inert organic solvent.

15. The process in accordance with claim 14 wherein said inert organic solvent is selected from the group consisting of diethyl ether, tert-butyl methyl ether, hexane derivatives, heptane derivatives, ethyl acetate, isopropyl acetate, toluene and xylene derivatives.

16. The process in accordance with claim 15 wherein at least two inert organic solvents are combined for said precipitation.

17. The process in accordance with claim 1 wherein said diblock and triblock copolymers are purified by charcoal treatment.

18. The process in accordance with claim 1 wherein said poly (N-vinylpyrrolidone) formed in step (a) has a number average molecular weight between 1,000 D and 700 kD.

19. The process in accordance with claim 1 wherein said diblock and triblock copolymers have a number average molecular weight between 2,000 D and 700 kD.

20. The diblock copolymer prepared by the process of claim 1.

21. The diblock copolymer of claim 20 wherein said diblock copolymer is poly (N-vinylpyrrolidone)-block-poly (D,L-lactide).

22. The triblock copolymer prepared by the process of claim 1.

23. The triblock copolymer of claim 22 wherein said triblock copolymer is poly (D,L-lactide)-block-poly (N-vinylpyrrolidone)-block-poly(D,L-lactide).

* * * * *